(12) United States Patent
Firestone

(10) Patent No.: US 7,319,745 B1
(45) Date of Patent: Jan. 15, 2008

(54) VOICE CONFERENCE HISTORICAL MONITOR

(75) Inventor: Scott S. Firestone, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1044 days.

(21) Appl. No.: 10/422,044

(22) Filed: Apr. 23, 2003

(51) Int. Cl.
*H04M 3/42* (2006.01)

(52) U.S. Cl. ............... 379/202.01; 370/260; 709/204; 709/205

(58) Field of Classification Search ........... 379/202.01; 709/204, 205; 370/260
See application file for complete search history.

(56) References Cited

U.S. PATENT DOCUMENTS

| | | | |
|---|---|---|---|
| 5,212,726 A | 5/1993 | Dayner et al. | 379/202 |
| 5,450,481 A | 9/1995 | Penzias | 379/202 |
| 6,125,115 A | 9/2000 | Smits | 370/389 |
| 6,178,237 B1 * | 1/2001 | Horn | 379/202.01 |
| 6,332,153 B1 * | 12/2001 | Cohen | 709/204 |
| 6,628,767 B1 * | 9/2003 | Wellner et al. | 379/202.01 |
| 7,143,110 B2 * | 11/2006 | Tomari et al. | 707/104.1 |

OTHER PUBLICATIONS

Patent Application entitled: "System and Method For Volume Indication During a Communication Session", U.S. Appl. No. 10/059,675, filed Jan. 29, 2002.

* cited by examiner

*Primary Examiner*—Quynh H. Nguyen
(74) *Attorney, Agent, or Firm*—Baker Botts L.L.P.

(57) ABSTRACT

A method for displaying a voice conference historical monitor is provided. A summation of a plurality of voice streams is received at a user's endpoint of a multipoint conference, each voice stream being associated with a respective one of a plurality of speakers' endpoints of the multipoint conference. A record of participants of the multipoint conference and historical tracking data regarding a volume of each speaker that participates in the multipoint conference may also be received. In accordance with a particular embodiment of the present invention, the record of participants in the historical tracking data are displayed at the user's endpoint. The record of participants and the historical tracking data may be displayed as a cumulative short term response graph. Furthermore, the record of participants and the historical tracking data may be displayed as a historical time line graph.

36 Claims, 2 Drawing Sheets

US 7,319,745 B1

VOICE CONFERENCE HISTORICAL MONITOR

TECHNICAL FIELD OF THE INVENTION

The present invention relates in general to the field of packet-based communication networks and, in particular, to a voice conference historical monitor system and method.

BACKGROUND OF THE INVENTION

Historically, telecommunications have involved the transmission of voice and fax signals over a network dedicated to telecommunications, such as the Public Switched Telephone Network (PSTN) and Private Branch Exchange (PBX). Similarly, data communications between computers have been historically transmitted on a dedicated data network, such a Local Area Network (LAN) or a Wide Area Network (WAN). Currently telecommunications and data transmissions are being merged into an integrated communication network using technology such as Voice over Internet Protocol (VoIP). Since many LANs and WANs transmit computer data using Internet Protocol (IP), VoIP uses this existing technology to transmit voice and fax signals by converting these signals into digital data and encapsulating the data for transmission over an IP network. However, the integration of telecommunications and data transmissions is ongoing, and many features and functionality that were available to users of traditional telecommunications networks have not been made available to users of VoIP and similar technologies.

Traditional communication networks often support multipoint conferences between a number of participants using different communication devices. A Multipoint Control Unit (MCU) is used to couple these devices, which allows users from distributed geographic locations to participate in the conference. The conference may be audio only (e.g. teleconference), or video conferencing/broadcasting may be included. A single MCU may be used to accommodate thousands of participants in a multipoint conference. Since many users enter the multipoint conference at different points in time, and may be diverted away from the multipoint conference temporarily, it is difficult for those users to gain an understanding of how the multipoint conference progressed in their absence.

SUMMARY OF THE INVENTION

The present invention includes a voice historical monitor system and method that substantially eliminates or reduces the disadvantages or problems thus associated with previously developed systems and methods. In particular, the present invention contemplates a voice historical monitor that displays for users, a graph that indicates the identity of each participant of the multipoint conference as the amount each participant contributed to the multipoint conference over time. Accordingly, users are provided with an easily identifiable reference for determining the progression of the multipoint conference at any point in time.

In accordance with a particular embodiment of the present invention, a method for displaying a voice conference historical monitor includes receiving a summation of a plurality of voice streams at a user's endpoint of a multipoint conference. Each voice stream is associated with one of a plurality of speaker endpoints of the multipoint conference. A record of participants of the multipoint conference and historical tracking data regarding a volume of each speaker that participates in the multipoint conference is also received. The record of participants and the historical tracking data may be displayed at a user's endpoint. The record of participants and historical tracking data may be displayed as a cumulative short term response graph. Alternatively, the record of participants and the historical tracking data may be displayed as a historical time line graph.

Technical advantages of the particular embodiment of the present invention include a voice historical monitor that graphically display to users an indication of the identity of each participant, and the amount that each participant contributed to the multipoint conference over time. Accordingly, each user is provided with a reference to determine the progression of the multipoint conference at any point in time.

Another technical advantage or particular embodiments of the present invention include one or more graphical displays that may be understood intuitively by a user. Accordingly, training and/or users' manuals are not required for operation.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

Figure 1:
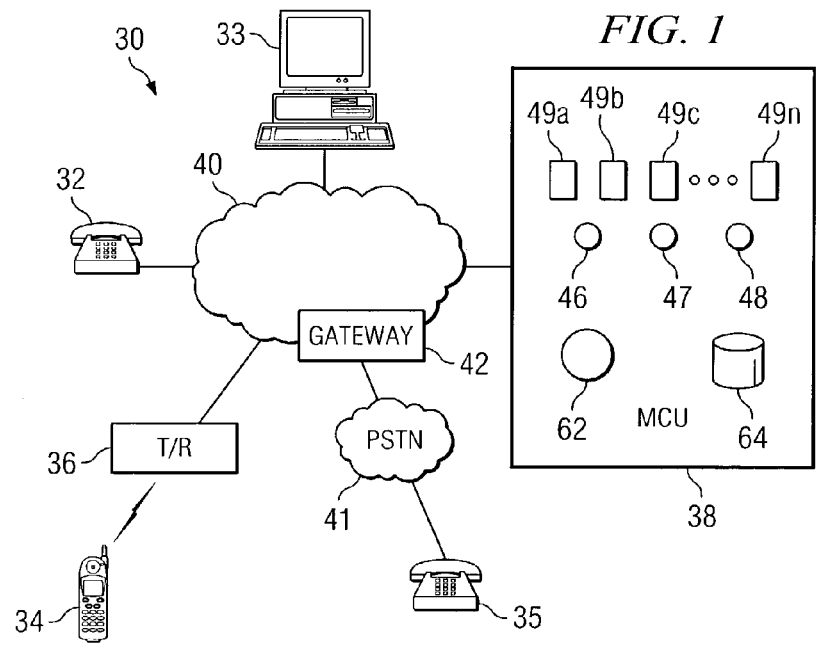
FIG. 1 illustrates a communications network in accordance with a particular embodiment of the present invention.

FIG. 1 illustrates a communication system 30 including a plurality of endpoints 32-35 having the ability to establish communication sessions with each other, and/or a multipoint control unit (MCU) 38. Such communication sessions may be established using communication networks 40, 41, and/or additional endpoints, components or resources coupled with communication networks 40 or 41. MCU 38 accommodates multipoint conferences between and among endpoints 32-35. MCU 38 includes a plurality of digital signal processors (DSPs) 46-48, and a plurality of communication ports 49a-49n.

In accordance with the present invention, a system(s) and method(s) are provided that allow users of endpoints 32-35 to determine the identity and contribution of each participant to the multipoint conference. More particularly, in a particular embodiment, each user is provided with a graphical display that includes a list of conference participants, along with a fine grained or coarse grained historical indication of how much voice activity each participant has provided over time. This may be particularly useful to a user that joins the multipoint conference after it has begun, since the user will be able to determine how the conference has progressed since its beginning.

The multipoint conference may be a Meet Me Conference call. A Meet Me Conference call is an arrangement by which a user can dial a specific, pre-determined telephone number and enter a security access code to join a conference with other participants. The user is automatically connected to the conference through a conference bridge. Conference participants may call in at a preset time or may be directed to do so by a conference coordinator. Meet Me Conferences may be set up through a teleconferencing service provider, generally with the capability to conference thousands of participants in a single conference call. However, other types of multipoint conferences may be accommodated, within the teachings of the present invention.

Endpoints 32-35 may be any combination of hardware, software, and/or encoded logic that provide communication services to a user. For example, endpoints 32-35 may include a telephone, a computer running telephony software, a video monitor, a camera, or any other communication hardware, software, and/or encoded logic that supports the communication of packets of media using communication network 40. In the illustrated embodiment, endpoints 32-34 include an internet telephone, a personal computer and wireless handset, respectively. A wireless transmitter/receiver 36 couples endpoint 34 with communication network 40. Endpoints 32-35 may also include unattended or automated systems, gateways, other intermediate components, or other devices that can establish media sessions. Although FIG. 1 illustrates four endpoints 32-35, communication system 30 contemplates any number and arrangement of endpoints 32-35 for communicating media. For example, the described technologies and techniques for establishing a communication session between or among endpoints 32-35 may be operable to establish a multipoint conference between more than two endpoints 32-35.

MCU 38 may include any bridging or switching device used in support of multipoint conferencing, including videoconferencing. In various embodiments, MCU 38 may include hardware, software, and/or embedded logic. MCU 38 may be configured to support more than twenty-eight conference endpoints, simultaneously. MCU 38 may be in the form of customer provided equipment (CPE, e.g., beyond the network interface) or may be embedded in a wide area network (WAN). Examples of multipoint conference unit standards are defined in ITU-T H.323, with H.231 describing MCU control functions.

Although specific communication networks 40 and 41 are illustrated in FIG. 1, the term "communication network" should be interpreted as generically defining any network capable of transmitting audio and/or video telecommunications signals, data and/or messages. Communication network 40 may be any computer or communication network capable of coupling two or more endpoints 32-35, for communication. In the illustrated embodiment, communication network 40 is a wide area network (WAN) that enables communication between a plurality of endpoints distributed across multiple cities and geographic regions and communication network 41 is a public switched telephone network (PSTN), However, communication networks 40 and/or 41 may be one or more networks, including the Internet, the public switched telephone network, local area networks (LANs), global distributed networks such as intranets, extranets, or other form of wireless or wireline communication networks. Generally, communication networks 40 and 41 provide for the communication of packets, cells, frames, and/or other portions of information (generally referred to as packets) between and among endpoints 32-35. Communication paths for the communication of such packets may include any combination of routers, hubs, switches, gateways (e.g., gateway 42) or other hardware, software, or embedded logic implementing any number of communication protocols that allow for the exchange of packets in communication system 30.

In a particular embodiment, communication network 40 employs communication protocols that allow for the addressing or identification of endpoints 32-35 coupled to communication network 40. For example, using Internet protocol (IP), each of the components coupled together by communication network 40 in communication system 30 may be identified in information directed using IP addresses. In this manner, communication network 40 may support any form and combination of point-to-point, multicast, unicast, or other techniques for exchanging media packets among components in communication system 30.

In the illustrated embodiment, MCU 38 includes a processor 62 and memory 64. Processor 62 may be a microprocessor, controller, or any other suitable computing device or resource. Memory 64 may be any form of volatile or nonvolatile memory including, without limitation, magnetic media, optical media, random access memory (RAM), read only memory (ROM), removable media, or any other suitable local or remote memory component. A user of communication system 30 may configure MCU 38 to accommodate a future multipoint conference, using processor 62 and memory 64. When a user or network administrator schedules or otherwise establishes a multipoint conference, MCU 38 prompts the administrator to identify the number of participants and a unique identifier associated with each participant.

Any given communication session between two of endpoints 32-35 will include the transfer of packets across one or more communication paths, that couple endpoints 32-35 and/or MCU 38 across communication network 40. Such paths may include any combination of network components, gatekeepers, call managers, routers, hubs, switches, gateways, endpoints, or other hardware, software, or embedded logic implementing any number of communication protocols that allow for the exchange of packets in communication system 30.

Network 40 may be directly coupled to other IP networks including, but not limited to, the Internet. Since IP networks share a common method of transmitting data, telecommunication signals may be transmitted between telephony devices located on different, but interconnected, IP networks. In addition to being coupled to other IP networks, network 40 may also be coupled to non-IP telecommunication networks through the use of gateway 42. For example, network 40 is coupled to Public Switched Telephone Network (PSTN) 41. PSTN 41 includes switching stations, central offices, mobile telephone switching offices, pager switching offices, remote terminals, and other related telecommunications equipment that are located across the country.

IP networks transmit data (including voice and video data) by placing the data in packets and sending each packet individually to the selected destination. Unlike a circuit-switched network (like PSTN 41), dedicated bandwidth is not required for the duration of a call or fax transmission over IP networks. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VoIP). In the illustrated embodiment, endpoints 32-34 and MCU 38 are IP telephony devices. IP telephony devices have the capability of encapsulating a user's voice (or other inputs) into IP packets so that the voice can be transmitted over network 40. Similarly, IP telephony devices 32-34 have the capability of capturing and encapsulating video into IP packets so that the video can be transmitted over network 40. Conversely, IP telephony devices 32-34 have the capability of receiving audio or video IP packets from the network 40 and playing the audio or video data to a user.

A codec (coder/decoder) at the endpoint converts the voice, video or fax signals generated by the users of the telephony devices from analog media signals into digital form. The codec may be implemented either in software or as special-purpose hardware in the endpoints. In the case of an IP telephone, as the user speaks into the handset, the codec converts the analog voice signals into digital data. The digitally encoded data is then encapsulated into IP packets so that it can be transmitted over network 40. Conversely, another codec at the receiving endpoint converts the digital data into analog media for the users of the telephony devices. In the case of an IP telephone, digital data from IP encapsulated packets are received from the network 40. The codec at the receiving endpoint converts the digital voice, video or fax data from the network 40 into analog media to be played to the users of the telephony devices.

Gateway 42 accomplishes several things. For example, gateway 42 may convert analog or digital circuit-switched data transmitted by PSTN 41 to packetized data transmitted by network 40, and vice-versa. When voice data packets are transmitted from network 40, gateway 42 retrieves the data contained in the incoming packets and converts this digital data to the analog or digital format used by the PSTN trunk to which gateway 42 is coupled. Since the digital format for voice transmissions over an IP network is often different than the format used on the digital trunks of PSTN 41, the gateway provides conversion between these different digital formats, which is referred to as transcoding. Gateway 42 also translates between the VoIP call control system and other signaling protocols (e.g., SS7, T1, ISDN, etc.), used in PSTN 41.

For voice transmissions from PSTN 41 to network 40, the process is reversed. In a particular embodiment, gateway 42 takes the incoming voice transmission (in either analog or digital form) and converts it into the digital format used by network 40. The digital data is then encapsulated into IP packets and transmitted over network 40.

Figure 2:
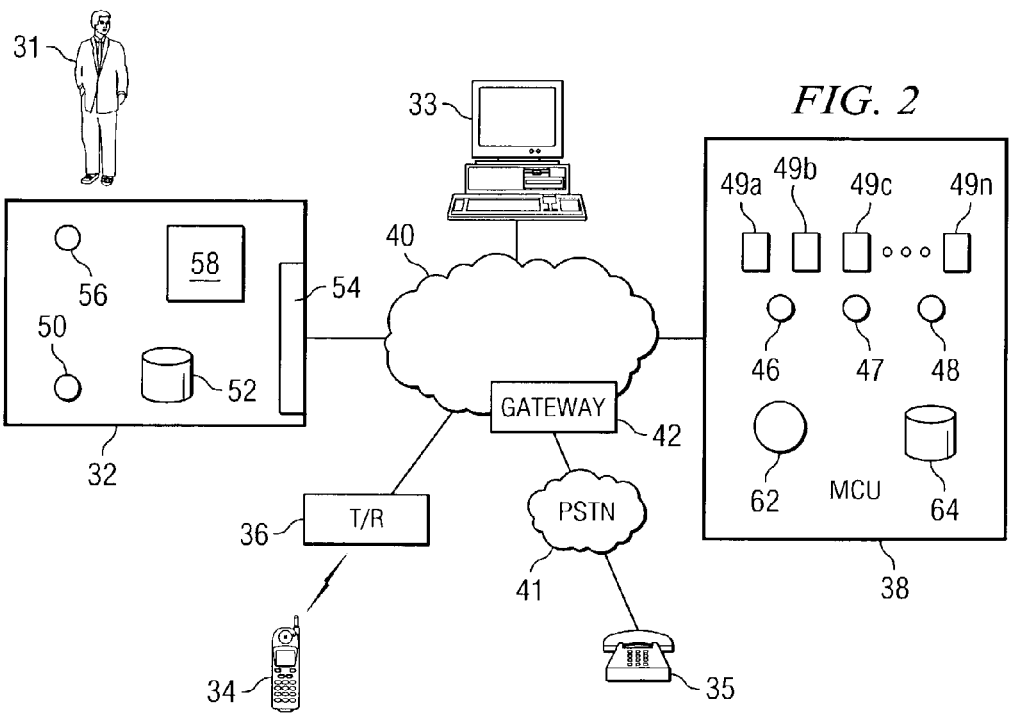
FIG. 2 illustrates a multipoint conference communication session among users of endpoints of the communication network of FIG. 1, in accordance with a particular embodiment of the present invention.

FIG. 2 illustrates a multipoint communication conference between endpoints 32-35 using MCU 38. Since endpoints 32-35 include similar components and functionality, it should be recognized that all endpoints coupled with network 40 may include the components and functionality described with regard to endpoint 32. Endpoint 32 includes a processor 50, memory 52, a network interface 54, and a codec 56. Endpoint 32 also includes a user interface 58, which may include a microphone, video camera, speaker, keyboard, and/or video display. In accordance with another embodiment, user interface 58 may be coupled with components that include a microphone, video camera, speaker, keyboard, and/or video display, rather than incorporating such components into endpoint 32. Endpoints 33-35 include similar or identical components to endpoint 32, having similar functionality.

During a communication session between endpoints 32, 33, 34, 35 and/or 38, user 31 generates analog audio (e.g., speech) that is captured by a microphone at user interface 58. The analog audio is transmitted to codec 56 where the analog audio is digitized for transmission across network 40. The digitized audio is transmitted to network interface 54 and transmitted across network 40 as a plurality of packets which include the digitized audio. A stream of such packets may be referred to as a digital audio stream.

The digital audio stream is received at network interfaces, and transmitted to codecs associated with the other endpoints and/or MCU 38, where the digital audio stream is decoded and transmitted to other users. User interfaces 58 associated with the other endpoints play the decoded audio stream in an analog format, to such users. Although delays may be encountered in the transmission of the analog audio stream received at the user interfaces until it is played by the user interfaces to the users, the communication is considered "real-time".

In many instances, user interface 58 will also capture video generated by user 31 at a video camera coupled with or integral to user interface 58. The analog video captured by user interface 58 is transmitted to codec 56, digitized, and transmitted to user interface 58, packetized, transmitted across network 40 as a digital video stream, received at network interfaces associated with the other networks, decoded by respective codec and played to users by respective user interfaces. Delays may be encountered during this process, but the communication of video is considered "real-time". In general, and for reasons generally apparent to those skilled in the art, the delays associated with the transmission of video are typically greater than delays associated with the transmission of audio.

In the illustrated embodiment, MCU 38 acts as an intermediary during the multipoint communication conference, and collects all audio and/or video streams transmitted by the endpoints, and distributes such streams to the participants of the multipoint conference. Typically, for Internet Protocol (IP) telephony applications, conferences are "hosted" by a MCU. Although the description herein will focus primarily on audio media, it should be recognized that MCU 38 may handle video, and/or additional media types as well, in a similar manner to the way in which it handles audio media (streams).

In the illustrated embodiment, multiple audio-enabled terminal endpoints connect to MCU 38 to form the multipoint conference. Each endpoint transmits audio to MCU 38. An audio subsystem of MCU 38 sums together the streams from each endpoint and transmits copies of that summation back to each endpoint, via either unicast or multicast. MCU 38 may use one or more of various methods of audio stream summation. One simplified method is to sum only the three "loudest" audio streams.

Aspects of the invention involve coordination between the MCU that is hosting a multipoint audio (and/or video)-enabled conference, with endpoints participating or involved in the multipoint conference. In accordance with the invention, the MCU may maintain a record of participants who join the conference, and also a historical tracking of the volume of speakers during the conference. The MCU transmits this information to the endpoints, and the endpoints display the information in graphical form on a graphic rich display (e.g., user interface 58). Each endpoint may be capable of displaying information about all conference participants.

As discussed above, a simplified version of collecting this information by the MCU, involves tracking the three loudest speakers at any one time to conform to simplified volume detection techniques and methods used by some MCUs. In accordance with a particular embodiment of the invention using Cisco IP phones, a web server serves XML information to the endpoints which describes data to be displayed on a user interface of the endpoint. It is envisioned that the MCU may send historical volume information to the endpoints for display in one or more of many ways, including; (i) the MCU acting as a web server to provide voice history data directly to the endpoints; and (ii) if a phone is restricted to use another web server, the MCU may send the voice history data to that web server via network protocol, which then transmits the data to the endpoint.

The teachings of the present invention include systems, methods, and techniques that may be used to display the historical voice information of the endpoints. At least two types of graphs are contemplated by the present invention for accomplishing this; (i) a cumulative/short term response graph; and/or (ii) a historical time line graph.

Figure 3:
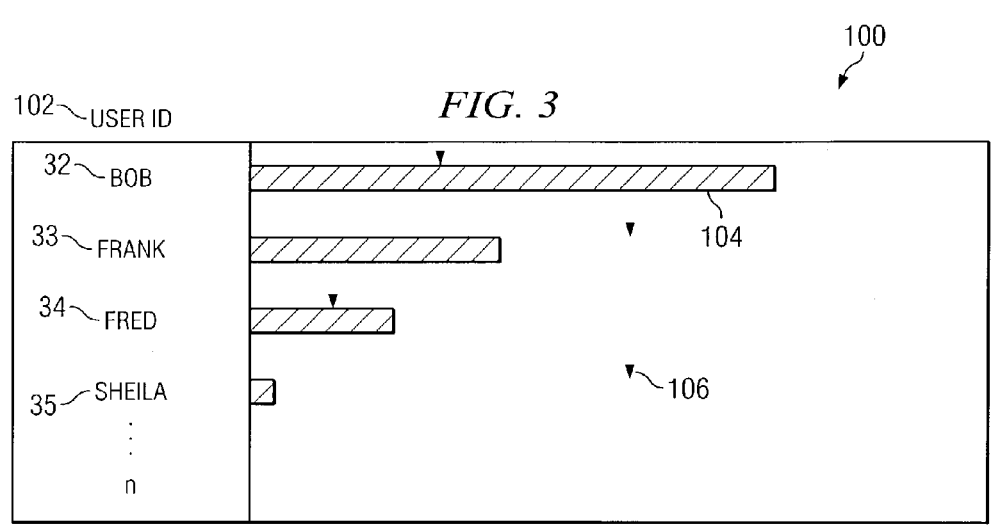
FIG. 3 illustrates a cumulative/short term response graph in accordance with a particular embodiment of the present invention.

FIG. 3 illustrates a cumulative, short term response graph 100 in accordance with a particular embodiment of the present invention. Graph 100 provides two metrics for each participant of the multipoint conference: (i) the total amount of talk time that has been contributed by that participant; and (ii) an indication of how recently the participant has contributed to the discussion. The graphical display(s) of the present invention is meant to be intuitive without requiring any type of training and/or instruction manual. By viewing graph 100 for a few seconds and recognizing how it is dynamically updated, it may immediately become apparent to the user how the data is being maintained and updated, and precisely the type of information being communicated visually, by graph 100.

Graph 100 displays each participant of the conference in a single line 102, using a user ID. In the illustrated embodiment, the user ID of each participant is the first name of the participant. Therefore, the participants of the multipoint conference depicted in FIG. 3 include Bob, Frank, Fred and Sheila. As an example, Bob may be using endpoint 32, and Frank, Fred and Sheila may be using endpoints 33-35, respectively, although any number or of participants may be included in the multipoint conference. In other embodiments, any number of participants may participate in the conference and each could have their first name depicted in graph 100. Also, in alternative embodiments, the User ID may include an IP address of the endpoint, a telephone number associated with the endpoint and/or the user, and/or another alphanumeric user identification.

Each participant also has two associated graphical elements associated therewith. First, a solid horizontal bar graph element provides an indication of how recently the particular user spoke, during the multipoint conference. For purposes of illustration, the bar graph element associated with "Bob" is identified with the reference number 104, in FIG. 3. By comparing the overall length of bar graph element 104 associated with Bob, to those associated with other users, it is apparent that Bob has contributed the most to the multipoint conference, most recently.

Each participant also has an associated caret pointer associated therewith, indicating a total cumulative talk time of the participant. In the example of FIG. 3, caret pointer 106 is associated with Sheila, and indicates that Sheila has contributed the most cumulative talk time of the participants listed. It is worth noting that each of the graphical elements (bar graph element, and caret pointer) co-exist on the same line, and may be read independently of each other.

As a participant talks during the multipoint conference, the solid bar graph element increases in size. When the participant stops talking, the bar graph decreases in size. In accordance with a particular embodiment of the present invention, the level of the bar graph may be the output of an infinite impulse response (IIR) low pass filter. The input of the low pass filter may be a step function which has a value of 100 percent when the average volume of the participant is above a certain level, and a value of 0 percent when the average volume of the participant is below a certain value. The time constant of the low pass filter may be a fixed value. Users at all endpoints may get an idea of a participant's voice contribution characteristic, by observing the level of the bar graph associated with that participant, and whether the bar graph associated with that participant is increasing or decreasing.

If the bar graph is increasing, the participant is currently talking. The bar graph may be configured to follow a logarithmic arc, increasing it's level quickly at the beginning and slowly at the end. This logarithmic response amounts to a type of data companding; the precision of the visual measurement is proportional to the length that the speaker has been talking. For example, if someone has been talking for only 60 seconds, the visual accuracy of the bar graph may be of the magnitude +/-6 seconds. However, if someone has been talking for 20 minutes, the visual accuracy of the bar graph will be reduced to +/-2 minutes. This companded accuracy may be more useful for human consumption/viewing.

If the bar graph is decreasing, the participant is not currently talking. When the graph is decreasing, the time constant of the IIR filter is changed so that it is proportional to the recent cumulative talk time of the participant (for instance, the cumulative talk time during the last five minutes). In this manner, the exponential decay when the participant is not talking would be slower if the person has contributed larger recent cumulative talk time. By observing the speed of the bar graph when it decreases, end users can get a sense of how recently the person had been talking before he/she stopped.

In accordance with a particular embodiment of the present invention, the bar graph information is generated at the MCU and is transmitted to each endpoint (or the web server responsible for the endpoint display) via a reliable transmission protocol. The MCU can gather data at any resolution, but the data may be updated to the phone periodically; an initial update rate of 2 seconds may be sufficient. The MCU transmits a new set of complete data for all participants in each subsequent data transmission.

Figure 4:
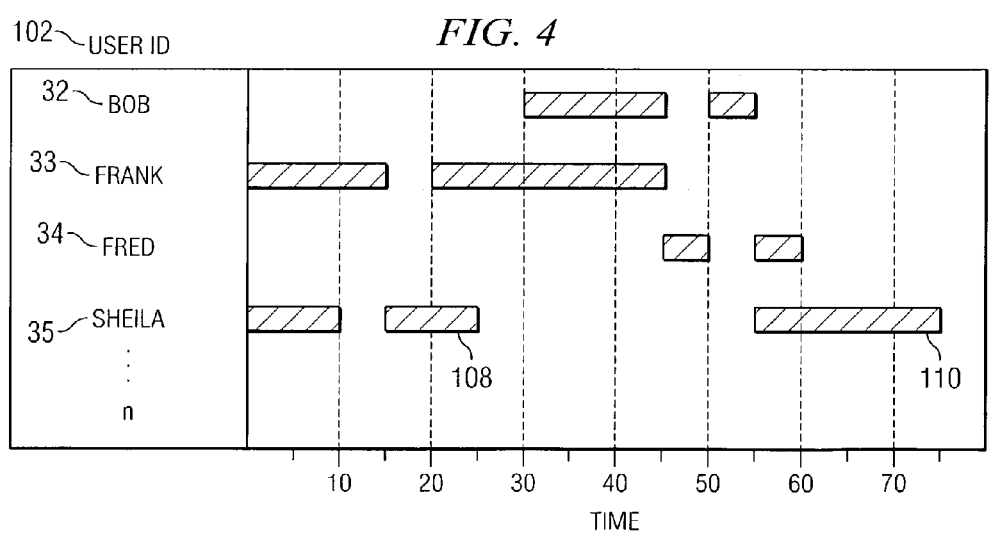
FIG. 4 illustrates a historical time line graph, in accordance with a particular embodiment of the present invention.

A particular embodiment of a historical time line graph contemplated by the present invention is illustrated in FIG. 4. While the display of FIG. 3 may offer a quick, easy to read indication of historical participation of endpoints, an alternative display (FIG. 4) is a time line showing more detailed historical information. In this case, a list of endpoints is shown, with an endpoint identification on each line, followed by a linear time line for each endpoint.

A time line pointer advances continuously to the right of FIG. 4. If a user at an endpoint talks for a sufficient period of time, then a trigger is generated for that audio source and a solid horizontal segment is created for that time interval. For example, solid horizontal segments 108 and 110 are created for times during which Sheila is speaking. The time line for each participant listed on the display may be binary; an endpoint audio is either detected or not detected. The width of the segment (left to right in FIG. 4) corresponds to a duration of the endpoints talk time. It should be recognized with reference to FIG. 4, that silence would be depicted as any time interval in which no speaker has a corresponding solid horizontal segment. Furthermore, two or more speakers could speak at the same time, and each would have a respective solid horizontal segment for that particular time interval during which they were each talking.

In accordance with a particular embodiment of the present invention, a method for generating a trigger based on audio input, as described above, is to use a low pass filter. An input to the low pass filter has a value of 100 percent when the volume level of a participant is greater than a certain level, and value of 0 percent when the volume level is less than a certain level. If the output of the low pass filter exceeds 70 percent, then the audio trigger is generated and a segment is added to the timeline. A time constant of the low pass filter may be selected to eliminate or reduce noise and false triggers.

The timeline information is generated at the MCU and transmitted to each endpoint (or the web server responsible for endpoint display) via a reliable transmission protocol. The MCU transmits incremental information, which contains data gathered since the last data transmission. The MCU may gather historical data at any particular resolution, but the data may be updated to the endpoints periodically; it is contemplated that an initial update rate of 5 seconds may be sufficient. As described above with regard to FIGS. 3 and 4, there are two cumulative pointers that can be displayed on the phone. The caret pointer is used to display the short term/cumulative graph. The time line pointer is used to display the horizontal time graph. When a cumulative pointer approaches the right hand side of the display, the endpoint user interface will continually re-normalize the relative horizontal units of the graph, to keep the pointer fixed at or near the right side of the screen. Renormalizing will increase the amount of time displayed on the screen. For cumulative display pointers, it may be desirable to limit the maximum horizontal time span on the display for two reasons; (i) it likely that the conference participants are only interested in a previous recent interval of time to date, such as half of a hour; and (ii) a unit of horizontal time that is too large may result in a data readout that is too coarse-grained. Once the horizontal units reach the maximum value, the graph can begin scrolling to the left as the time increases.

It should be recognized by those of ordinary skill in the art that the teachings of the present invention may be incorporated into distributed multipoint systems. Distributed multipoint conferencing systems typically operate by including a MCU inside each endpoint. Each endpoint transmits the end user's voice data to all other endpoints (by either unicast or Multicast means). Each endpoint receives streams from all other endpoints, and performs the audio summation to create the audio signal that is heard by the end user. The teachings of the present invention apply to such distributed multipoint conferencing systems by simply including functionality described herein, in each endpoint-embedded MCU. The embedded MCU may transmit the voice history information to its host endpoint.

If multiple MCUs are "cascaded" together, each MCU views other MCUs as virtual endpoints. In order to support cascading, a MCU may act like an endpoint and accept voice history from an adjacent MCU. Each MCU may incorporate its own voice history data and the data from other MCUs, and present the total set of data to the endpoints.

The teachings of the present invention may also be used to maintain conference statistics. Much like a conference record feature, the statistics of the conference may be gathered and presented as a summary of the conference. For instance, total talk time for each individual can be recorded in a database for future reference.

In any network that incorporates a policy server, the policy server can dictate precisely what information is gathered, who it is gathered from, and how it is to be displayed. For instance, it should be possible for certain non-participants to monitor the graphical information. Also, only some participants might be authorized to view the graphical information. The graphical user display described above with respect to the present invention, may be useful for participants who join a conference late. Normally, when a person connects to a conference that is already in session, the person has no idea how the discussion has progressed and has no information on which to determine how the discussion has been framed. However, by providing a graphical indication showing how voice activity over time has been contributed by each participant, the new participant can make some assumptions about how the discussion has been formed, and can more effectively direct initial questions.

Additional References Include:

ITU-T Recommendation H.323: Packet-Based Multimedia Communication Systems. International Telecommunication Union. February 1998.

Extensible Markup Language (XML) 1.0 (Second Edition).

W3C Recommendation 6 Oct. 2000.

http://www.w3.org/TR/REC-xml.

ITU-T Recommendation H.231: Multipoint Control Units for Audiovisual Systems Using Digital Channels up to 2 Mbits/sec. March 1993.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for displaying a voice conference historical monitor, comprising:
   receiving a summation of a plurality of voice streams at a user's endpoint of a multipoint conference, each voice stream being associated with a respective one of a plurality of speaker's endpoints of the multipoint conference;
   receiving a record of participants of the multipoint conference and historical tracking data regarding the volume of each speaker that participates in the multipoint conference; and
   displaying the record of participants and the historical tracking data at the user's endpoint.

2. The method of claim 1, wherein the record of participants and the historical tracking data is displayed as a cumulative short term response graph.

3. The method of claim 2, wherein the cumulative short term response graph is operable to display, for each one of the speakers: (i) a first metric including a total amount of talk time contributed by the one of the speakers; and (ii) a second metric including an indication of how recently the one of the speakers has contributed to the multipoint conference.

4. The method of claim 3, further comprising:
   displaying on the cumulative short term response graph a list of unique identifiers, each unique identifier being associated with a respective one of the speakers, and a plurality of bar graphs, each bar graph being associated with a respective one of the unique identifiers and a respective one of the speakers, and each bar graph providing an indication of how recently the respective one of the speakers spoke.

5. The method of claim 4, wherein each bar graph includes a respective caret pointer providing an indication of a total cumulative talk time of the respective one of the speakers.

6. The method of claim 5, wherein each bar graph includes an associated solid bar graph element that increases in size while the respective one of the speakers is speaking, and decreases in size when the respective one of the speakers is not speaking.

7. The method of claim 6, wherein each solid bar graph includes a respective level that is determined by the output of an infinite impulse response low pass filter, and each solid bar graph generally follows a logarithmic arc and increases its level relatively quickly at an earlier part of the speaking of the speaker, and increases more slowly at a later part of the speaking of the speaker.

8. The method of claim 1, wherein the record of participants and the historical tracking data is displayed as a historical timeline graph.

9. The method of claim 8, wherein the historical time graph is operable to display, for each one of the speakers: (i) a linear timeline for each participant endpoint; and (ii) a timeline pointer being associated with the linear timeline.

10. The method of claim 9, further comprising creating a solid horizontal segment for any time interval of the linear timeline during which the respective speaker spoke for at least a predetermined period of time.

11. The method of claim 10, wherein a width of the solid horizontal segment corresponds to a duration during which the respective speaker was speaking.

12. A method for multipoint control of a telephone conference, comprising:
receiving a plurality of audio streams, each being associated with a respective one of a plurality of speaker's endpoints of a multipoint conference;
summing the plurality of audio streams;
transmitting each of the plurality of audio streams to each of a plurality of participant endpoints; and
transmitting a record of participants of the multipoint conference and historical tracking data regarding a volume of each speaker that participates in the multipoint conference.

13. The method of claim 12, wherein the historical tracking data includes, for each once of the speakers, a total amount of talk time contributed by the one of the speakers, and an indication of how recently the one of the speakers has contributed to the multipoint conference.

14. The method of claim 13, wherein the historical tracking data includes, for each one of the speakers, specific intervals in time during which the one of the speakers was speaking.

15. A telephone device, comprising:
a network interface being operable to receive a summation of a plurality of voice streams of a multipoint conference, each voice stream being associated with a respective one of a plurality of speaker's endpoints of the multipoint conference;
the network interface being further operable to receive a record of participants of the multipoint conference and historical tracking data regarding the volume of each speaker that participates in the multipoint conference; and
a graphical user interface being operable to display the record of participants and the historical tracking data.

16. The telephone device of claim 15, wherein the graphical user interface is further operable to display the record of participants and the historical tracking data as a cumulative short term response graph.

17. The telephone device of claim 15, wherein the graphical user interface is further operable to:
display a list of unique identifiers, each unique identifier being associated with a respective one of the speakers; and
display a plurality of bar graphs, each bar graph being associated with a respective one of the unique identifiers and a respective one of the speakers, and each bar graph providing an indication of how recently the respective one of the speakers spoke.

18. The method of claim 17, wherein each bar graph includes a respective caret pointer providing an indication of a total cumulative talk time of the respective one of the speakers.

19. The method of claim 15, wherein the graphical user interface is further operable to display, for each one of the speakers: (i) a linear timeline for each participant endpoint; and (ii) a timeline pointer being associated with the linear timeline.

20. A multipoint control unit, comprising:
a network interface being operable to receive a plurality of audio streams, each audio stream being associated with a respective one of a plurality of speaker's endpoints of a multipoint conference;
a processor being operable to sum the plurality of audio streams;
the network interface being further operable to transmit each of the plurality of audio streams to each of a plurality of participants' endpoints; and
the network interface being further operable to transmit a record of participants of the multipoint conference and historical tracking data regarding the volume of each speaker that participates in the multipoint conference.

21. Media for displaying a voice conference historical monitor, the media including encoded logic being operable to perform the following steps:
receive a summation of a plurality of voice streams at a user's endpoint of a multipoint conference, each voice stream being associated with a respective one of a plurality of speakers endpoints of the multipoint conference;
receive a record of participants of the multipoint conference and historical tracking data regarding a volume of each speaker that participates in the multipoint conference; and
display the record of participants and the historical tracking data at the user's endpoint.

22. The media of claim 21 wherein the logic is further operable to display the record of participants and the historical tracking data a cumulative short term response graph.

23. The media of claim 22 wherein the logic is further operable to display, for each one of the speakers: (i) a first metric including a total amount of talk time contributed by the one of the speakers; and (ii) a second metric including an indication of how recently the one of the speakers has contributed to the multipoint conference.

24. The media of claim 23, wherein the logic is further operable to display, on the cumulative short term response graph, a list of unique identifiers, each unique identifier being associated with a respective one of the speakers, and a plurality of bar graphs, each bar graph being associated with a respective one of the unique identifiers and a respective one of the speakers, and each bar graph providing an indication of how recently the respective one of the speakers spoke.

25. The media of claim 21, wherein the record of participants and the historical tracking data is displayed as a historical time line graph.

26. The media of claim 25, wherein the logic is further operable to display, for each of the speakers; (i) a linear time line for each participant endpoint; and (ii) a time line pointer being associated with the linear time line.

27. The media of claim 26, wherein the logic is further operable to create a solid horizontal segment for any time interval of the linear time lime during which the respective speaker spoke for at least a predetermined amount of time.

28. Media for multipoint control of a telephone conference, wherein the media includes encoded logic operable to perform the following steps:

received a plurality of audio streams, each being associated with a respective one of a plurality of speakers' endpoints of a multipoint conference;

sum the plurality of audio streams;

transmit each of the plurality of audio streams to each of a plurality of participants endpoints;

transmit a record of participants of the multipoint conference and historical tracking data regarding the volume of each speaker that participates in the multipoint conference.

29. A system for displaying a voice conference historical monitor, comprising:

means for receiving a summation of a plurality of voice streams at a user's endpoint of a multipoint conference, each voice stream being associated with a respective one of a plurality of speakers' endpoints of the multipoint conference;

means for receiving a record of participants of the multipoint conference and historical tracking data regarding a volume of each speaker that participates in the multipoint conference; and means for displaying the record of participants and the historical tracking data at the user's endpoint.

30. The system of claim 29, wherein the record of participants and the historical tracking data is displayed as a cumulative short term response graph.

31. The system of claim 30, further comprising means for displaying, for each one of the speakers: (i) a first metric including a total amount of talk time contributed by the one of the speakers; (ii) a second metric including an indication of how recently the one of the speakers has contributed to the multipoint conference.

32. The system of claim 31, further comprising means for displaying on the cumulative short term response graph a list of unique identifiers, each unique identifier being associated with a respective one of the speakers, and a plurality of bar graphs, each bar graph being associated with a respective one of the unique identifiers and a respective one of the speakers, and each bar graph providing an indication of how recently the respective one of the speakers spoke.

33. The system of claim 29, wherein the record of participants and the historical tracking data is displayed as a historical time line graph.

34. The system of claim 33, further comprising means for displaying, for each one of the speakers; (i) a linear time line for each participant endpoint; and (ii) a time line pointer being associated with the linear time line.

35. The system of claim 34, further comprising means for creating a solid horizontal segment for any time interval of the linear time line during which the respective speaker spoke for at least a predetermined period of time.

36. A system for multipoint control of a telephone conference, comprising;

means for receiving a plurality of audio streams, each being associated with a respective one of a plurality of speakers endpoints of a multipoint conference;

means for summing the plurality of audio streams;

means for transmitting each of the plurality of audio streams to each of a plurality of participant endpoints; and means for transmitting a record of participants of the multipoint conference and historical tracking data regarding a volume of each speaker that participates in the multipoint conference.

* * * * *